United States Patent [19]
Nakamura

[11] Patent Number: 5,610,797
[45] Date of Patent: Mar. 11, 1997

[54] CONTROL PANEL APPARATUS FOR ELECTRONIC DEVICES

[75] Inventor: Fumihiko Nakamura, Tokyo, Japan

[73] Assignee: Canon Kabushiki Kaisha, Tokyo, Japan

[21] Appl. No.: 393,908

[22] Filed: Feb. 24, 1995

[30] Foreign Application Priority Data

Mar. 9, 1994 [JP] Japan .................... 6-037460

[51] Int. Cl.⁶ ..................... G06F 1/16; H05K 5/03
[52] U.S. Cl. ........................... 361/681; 358/400
[58] Field of Search ..................... 361/681, 680, 361/683, 679; 358/400, 497; D14/115, 118; 364/708.1; 355/271, 206, 209; 362/85, 23, 29; 345/32, 75

[56] References Cited

U.S. PATENT DOCUMENTS

| | | | |
|---|---|---|---|
| D. 316,255 | 4/1991 | Yokoyama et al. | D14/118 |
| D. 332,258 | 1/1993 | Urushihara et al. | D14/118 |
| D. 340,721 | 10/1993 | Hirose et al. | D14/118 |
| D. 345,154 | 3/1994 | Kashiwabara et al. | D14/118 |
| D. 345,155 | 3/1994 | Hiroki et al. | D14/118 |
| 3,694,945 | 10/1972 | Detiker | 40/133 R |
| 4,503,294 | 3/1985 | Matsumaru | 200/5 A |
| 4,729,067 | 3/1988 | Ohe | 362/26 |
| 5,084,730 | 1/1992 | Deguchi | 355/75 |
| 5,300,943 | 4/1994 | Jakobs et al. | 345/173 |
| 5,329,377 | 7/1994 | Gregg | 358/400 |
| 5,432,684 | 7/1995 | Fye et al. | 362/30 |

*Primary Examiner*—Leo P. Picard
*Assistant Examiner*—Lynn D. Feild
*Attorney, Agent, or Firm*—Fitzpatrick, Cella, Harper & Scinto

[57] ABSTRACT

A control panel apparatus for electronic devices, provided with at least one control switch for activating a function of an electronic device and a display portion for displaying the function of the electronic device, in which a main body portion for covering the display portion of the electronic device and a control portion of the control switch are integrally formed as a display cover, in which a groove is formed in a border portion between the main body portion and the control portion in the display cover so as to make a wall there thin, and in which the control portion is arranged as rockable relative to the main body portion through the border portion whereby the control switch can be controlled.

10 Claims, 9 Drawing Sheets

CONTROL PANEL APPARATUS FOR ELECTRONIC DEVICES

BACKGROUND OF THE INVENTION

1. Field of the Invention

The present invention relates to a control panel apparatus for electronic devices, which is suitable for electronic devices such as facsimile devices, etc.

2. Related Background Art

With progress of information processing systems, a variety of information processing devices have been developed recently. Among these devices, the apparatus, for example such as facsimile devices and printers, are becoming widely used not only in offices, but also in ordinary homes.

Those having only a single function, out of such information processing devices, used a wide setting area for the instant function to require.

There are, however, recent demands to decrease the space by incorporating some information processing devices with different functions into a unit. For example, there are developed apparatus in which a facsimile device is incorporated with a printer etc. using a common recording means (as will be hereinafter referred to as a composite facsimile device).

Since the composite facsimile device has a variety of functions and thus needs control input switches (pushbutton switches, key switches, etc.) for controlling the respective functions, a lot of control input switches are inevitably jammed in the control panel. Therefore, the conventional apparatus had drawbacks that the switches were not readily discriminated from each other when a user used it and that the costs increased because of an increase in the number of switches.

SUMMARY OF THE INVENTION

Overcoming the above-described drawbacks, an object of the present invention is to provide a control panel apparatus for electronic devices which has a decreased number of components by integrally forming a control portion of switches with a display cover covering a display portion.

Another object of the present invention is to provide a control panel apparatus for electronic devices which can be assembled in a decreased number of assembling steps.

Further objects of the present invention will be apparent by a specific embodiment as detailed below.

DESCRIPTION OF THE PREFERRED EMBODIMENT

The embodiment of control panel apparatus and display cover according to the present invention will be described with reference to the drawings. The description concerns an embodiment of a control panel apparatus provided in a composite facsimile device having a facsimile function, a printer function, and an automatic answering telephone function, and a display cover provided in a display portion thereof.

Figure 1:
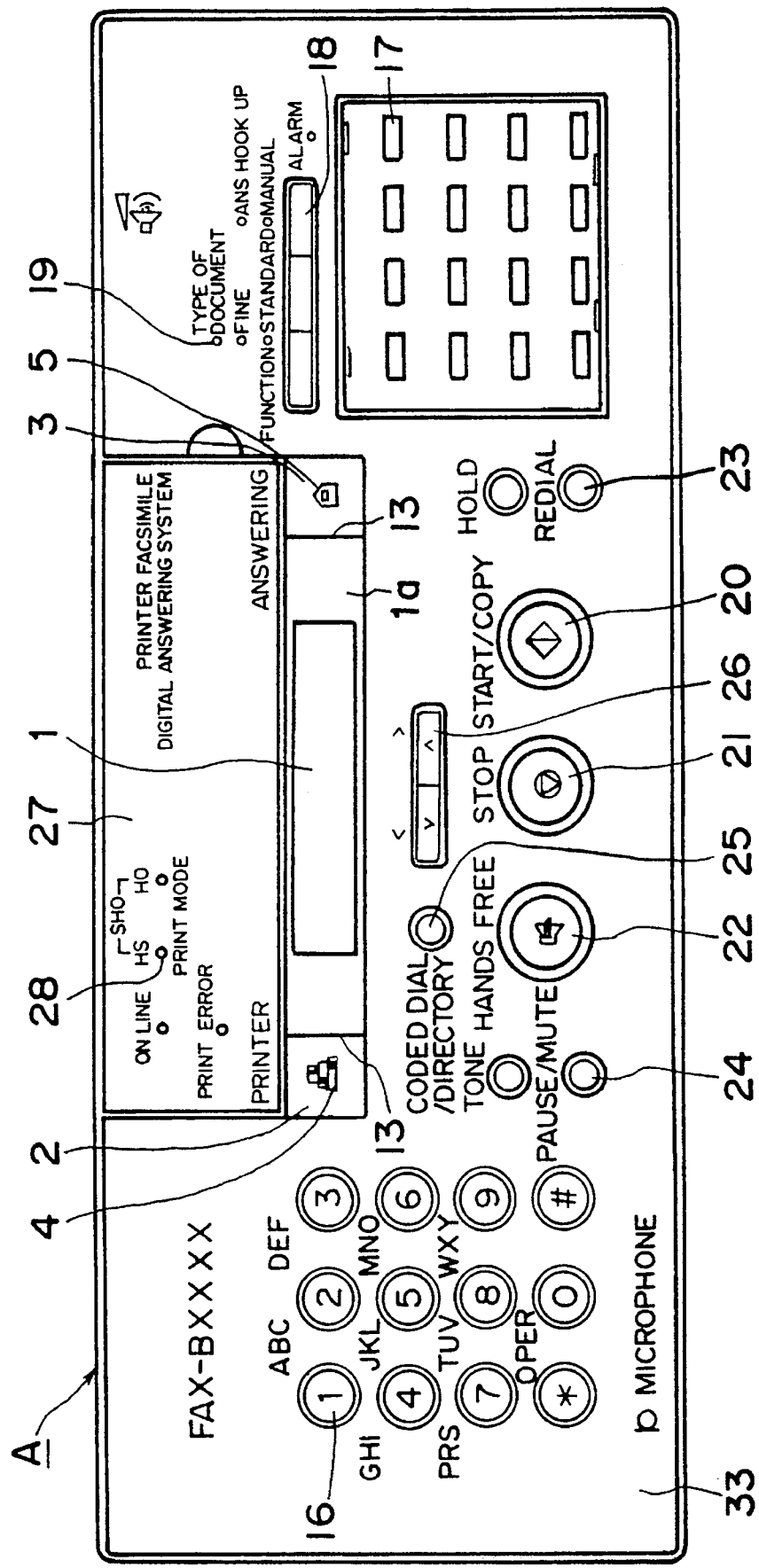
FIG. 1 is a top plan view of a control panel apparatus for electronic devices according to an embodiment of the present invention.
Figure 2:
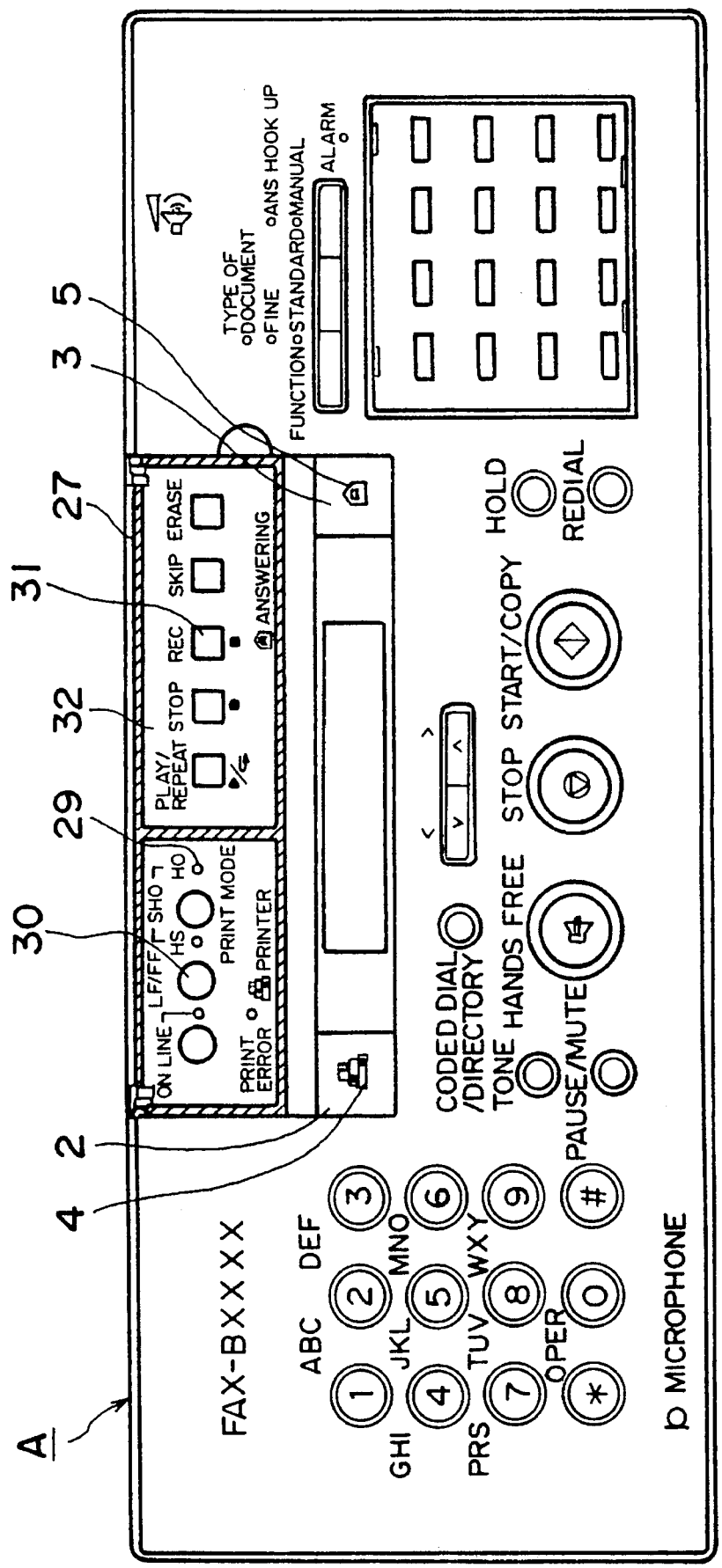
FIG. 2 is a top plan view of the control panel apparatus shown in FIG. 1 to show an open state of a key cover.

First described referring to FIG. 1 and FIG. 2 is the structure of the control panel in the control panel apparatus. FIG. 1 and FIG. 2 show appearances of the control panel, which are a closed state and an open state, respectively, of a key cover 27 as detailed later.

As shown in FIG. 1 and FIG. 2, a display cover 1 is provided in a central area of the control panel A so as to cover a display portion for display with LCD as detailed later. A printer button 2 and an answering button 3 are integrally formed with the cover 1 on the both left and right ends of the display cover 1. These buttons 2, 3 are pushbuttons or control portions for permitting an operator to control underlying pushbutton switches for changing over the functions of the composite facsimile device in which the control panel apparatus is set, from the facsimile function to the printer function or the automatic answering telephone function. Icon 4 or 5 is formed in the button 2 or 3, respectively. The details of the display cover 1 will be described hereinafter.

On the control panel A there are key switches (hereinafter called as keys) set as control input switches for controlling the various functions in the following manner. Dial keys 16 including ten keys essential to the telephone function are set in the left portion of the control panel A, while in the right portion there are one-touch keys 17 and function keys 18 for controlling the functions including one touch dial etc., and LED light guides 19 for transmitting light from LED to indicate a current function state of the apparatus.

Below the display cover 1 (or on this side), there are a start/copy key 20 for controlling transmission and reception of data as a function of the facsimile device and a copy function, a stop key 21, a hands free key 22 for controlling a hands free function to enable conversation in a hooking state of a receiver not shown, and dial mode keys 23, 24 for controlling functions of hold, redial, pulse/tone changeover, and pause as the telephone function. Further provided are a coded dial/(electronic) directory function key 25 and a search key 26 for movement and scroll of displayed contents.

Above the display cover 1 (or on that side), a key cover 27 is arranged as being capable of being opened or closed, so that it can cover a plurality of printer control keys 30 and answering control keys 31 as shown in FIG. 2. The printer control keys 30 and answering control keys 31 are keys for controlling respective functions in the printer function and respective functions in the automatic answering telephone function, respectively, which are set above and near the printer button 2 and the answering button 3, respectively. The printer control keys 30 and the answering control keys 31 are dependent on a pushbutton switch with the printer button 2 as a pushbutton and on a pushbutton switch with the answering button 3 as a pushbutton, respectively, and input functions of the printer control keys 30 or answering control keys 31 become active when the button 2 or 3 is pressed down to change over the functions of the composite facsimile device into the printer function or the automatic answering telephone function.

The key cover 27 is provided with LED light guides 28 so that a current function state of the printer can be indicated even if the key cover 27 is closed (i.e., even in the state where the printer control keys 30 and answering control keys 31 are covered as in FIG. 1). This arrangement can decrease the number of keys apparent on the control panel A while the key cover 27 is normally closed (where the apparatus is used as a facsimile device but is not used as a printer or an automatic answering telephone), thereby preventing a user from erroneously controlling the control panel.

Since above and near the printer button 2 and the answering button 3 there are the printer control keys 30 and the answering control keys 31 depending thereon, respectively, the control panel is easy to use in respect of operability by user. The printer button 2 and answering button 3 are self-emitting buttons in which the icons 4, 5 shine as detailed later, and emission colors of the buttons are set as a green base color for the button 2 and a red base color for the button 3. Colors of characters and symbols indicating the respective functions of the printer control keys 30 and answering control keys 31 and printed on a key control sheet 32, which is set on a surface where the printer control keys 30 and answering control keys 31 are set, are matched with the emission colors of the buttons 2, 3, for example the green base color for the characters and symbols of the printer control keys 30 and the red base color for the characters and symbols for the answering control keys 31, thus further enhancing the operability by user.

Figure 3:
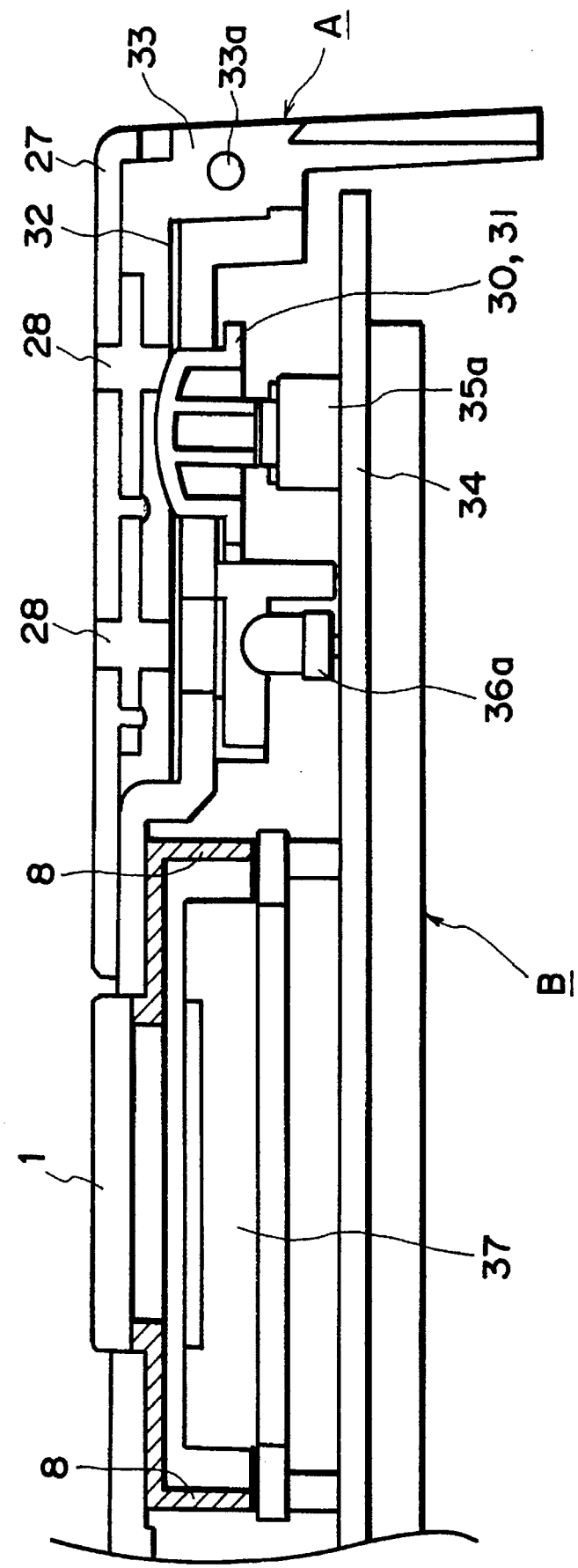
FIG. 3 is a transverse cross section of the control panel apparatus shown in FIG. 1.
Figure 4:
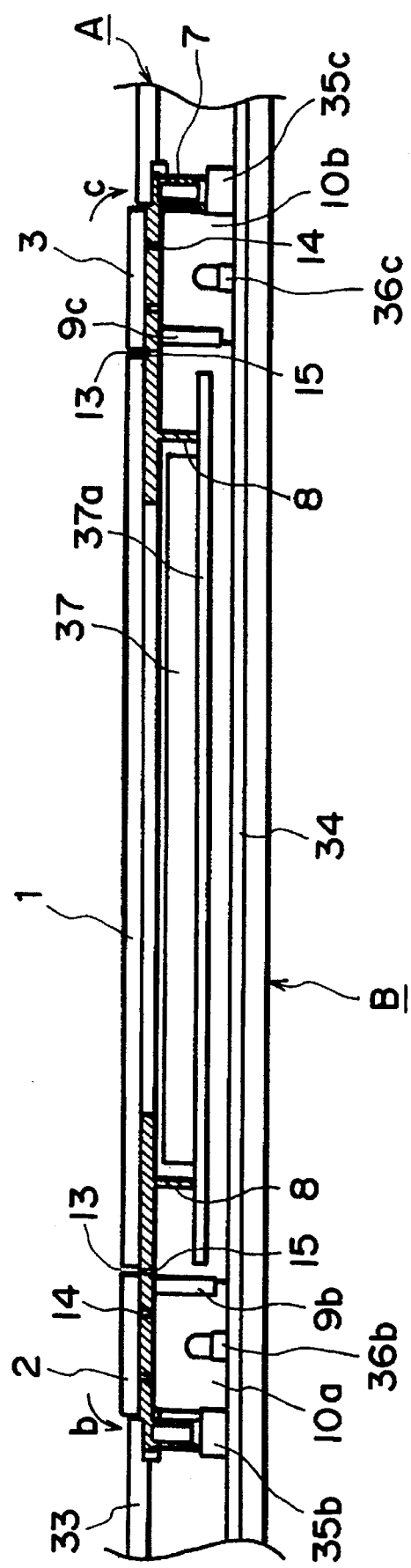
FIG. 4 is a longitudinal cross section of the control panel apparatus shown in FIG. 1.

Next described referring to FIG. 3 and FIG. 4 are the details of the inner structure around the display cover 1 in the control panel apparatus. FIG. 3 and FIG. 4 are the transverse cross section and the longitudinal cross section, respectively, around the display cover in the control panel apparatus.

In FIG. 3, the key cover 27 is rotatably supported through bearings not shown to a shaft 33a which a panel cover 33 covering the entire control panel apparatus has.

An electric equipment system B is provided inside the panel cover 33, and tact switch 35a, LED 36a, LCD (liquid crystal display) 37, etc. are mounted on an electric circuit board 34.

The tact switch 35a is a switch main body constituting a key switch of the printer control key 30 or answering control key 31 in FIG. 2, and a plurality of tact switches are provided. The printer control keys (key tops) 30 and answering control keys (key tops) 31 are set on the associated tact switches, so that each tact switch 35a is activated when a corresponding key is pressed down.

LED 36a is set near each of the tact switches 35a of the printer control keys 30, and immediately above each LED 36a there are a transparent portion 29 (FIG. 2) in the key control sheet 32 on which the characters and symbols for functions of the keys 30, 31 are printed, and a LED light guide 28 in the key cover 27, whereby upon emission of LED 36a the light therefrom is transmitted to make the top surface of LED light guide 28 shine.

In FIG. 3 and FIG. 4, the LCD 37 is set below the display cover 1, and tact switches 35b and 35c are set below the corresponding outside edges of the printer button 2 and answering button 3 integral with the display cover 1. Further, LED 36b and LED 36c are set below the icons 4, 5 (FIG. 5, FIG. 9, and FIG. 10), respectively, as detailed later and formed on the printer button 2 and answering button 3, respectively, whereby the icon 4 or 5 shines upon emission of corresponding LED 36b, 36c. Emission colors of LED 36b, 36c are determined for example a green base color for LED 36b and a red base color for LED 36c.

Figure 5:
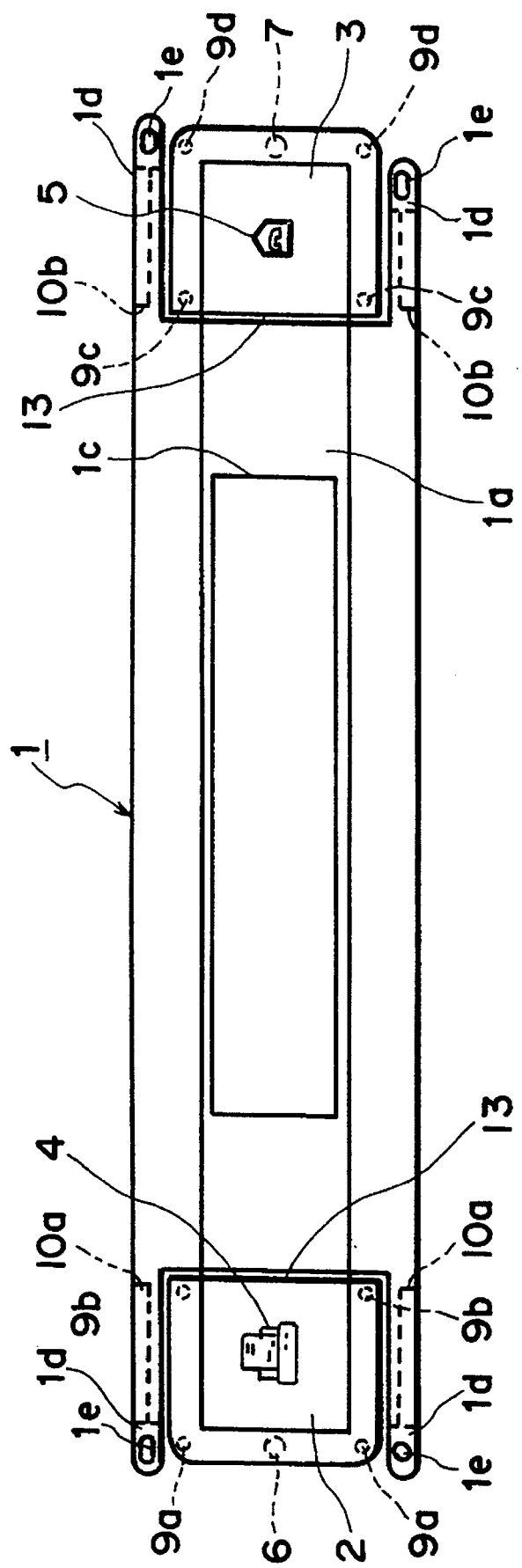
FIG. 5 is a top plan view of a display cover shown in FIG. 1.
Figure 6:
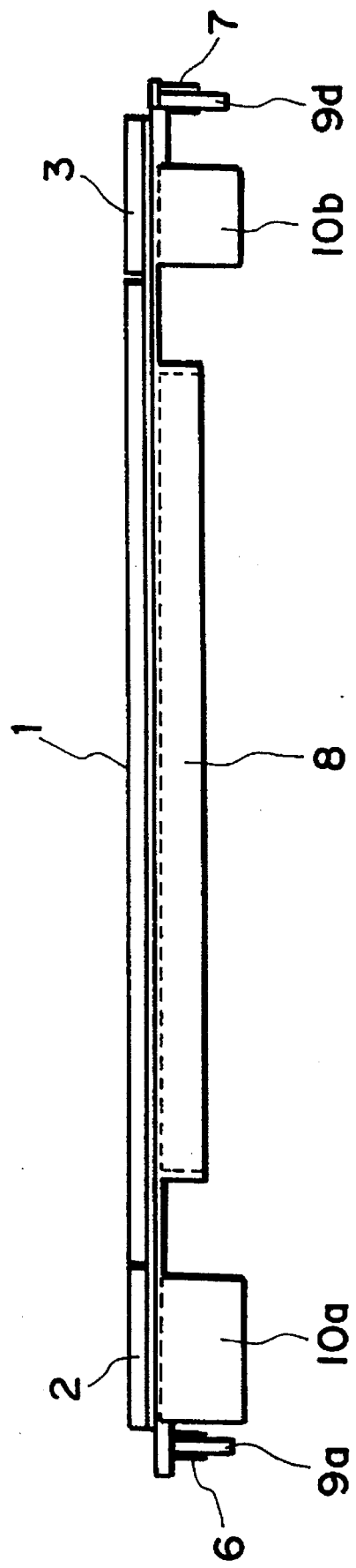
FIG. 6 is a side view of the display cover shown in FIG. 5.

The display cover 1 is next described in detail referring to FIG. 5 to FIG. 11. FIG. 5 is a top plan view of the display cover, FIG. 6 a front elevation thereof, FIG. 7 a longitudinal cross section thereof, FIG. 8 a transverse cross section thereof, FIG. 9 and FIG. 10 explanatory drawings of the icons, and FIG. 11 an enlarged cross section of a border portion between buttons and an icon portion in the display cover.

First described is the overall structure of the display cover.

Figure 11:
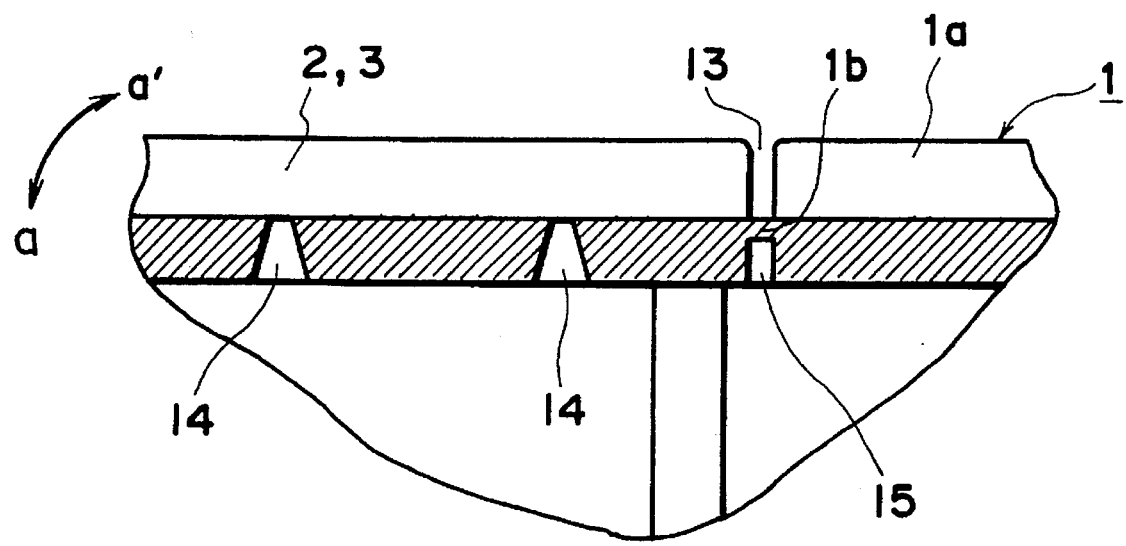
FIG. 11 is a detailed drawing of a border portion between a main body portion and a control portion of the display cover shown in FIG. 7.

As shown in FIG. 5, the display cover 1 is formed in a substantially rectangular plate shape as a whole, in which the printer button 2 and answering button 3 are integrally formed in the left and right end portions. On the top surface of the display cover 1, a groove 13 is formed in a border portion between the main body 1a of the display cover 1 and the each button 2, 3. Namely, the each groove 13 is the border. As shown in FIG. 11, a groove 15 is formed as opposed to the groove 13 in the lower surface of the display cover 1. Because of these grooves 13, 15, the border portion between the main body 1a and the each button 2, 3 is a thin wall portion 1b, which is thin in thickness and which is easy to be elastically deformed. The button 2, 3 is connected through the thin wall portion 1b to the display cover main body 1a so as to be elastically rockable in the directions of arrows a, a' in FIG. 11. The icon 4 or 5 as detailed later is formed on the button 2 or 3, respectively. The details of the icons 4, 5 will be described hereinafter.

Figure 7:
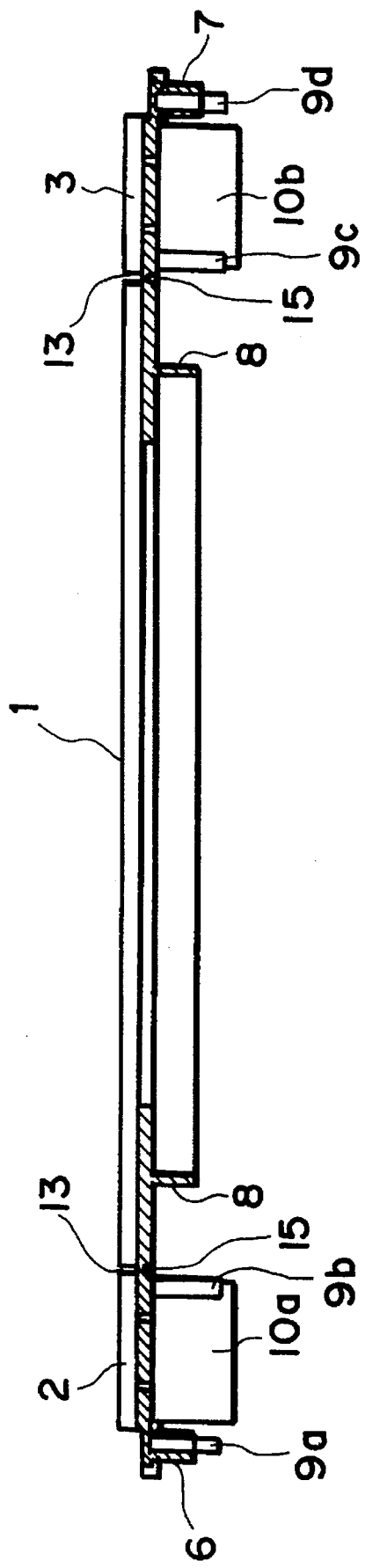
FIG. 7 is a longitudinal cross section of the display cover shown in FIG. 5.
Figure 8:
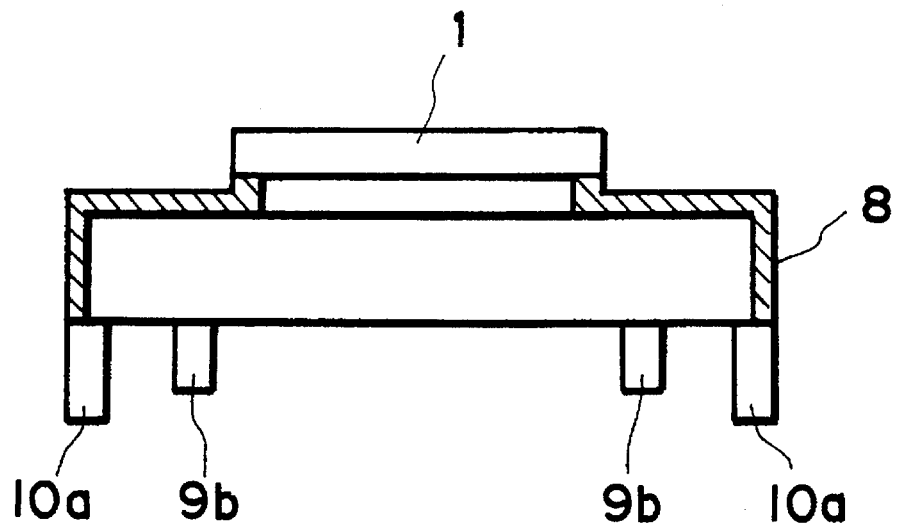
FIG. 8 is a transverse cross section of the display cover shown in FIG. 5.

The display cover 1 is formed of a colorless, transparent resin and an opaque resin having a predetermined color. The hatched portions in FIG. 7 represent the opaque resin of the predetermined color, and the transparent resin covers the top surface of the opaque resin. By this arrangement, a central window portion 1c (FIG. 1) is transparent immediately above the display surface of LCD 37 as observed from above the display cover 1, and the other portions are of the predetermined color except that portions of grooves 14 for forming the icons 4, 5 as detailed later are transparent. The opaque resin of the predetermined color is for example ABS of a black base color, while the colorless, transparent resin is a transparent acrylic resin. Using the two types of resins, the display cover 1 is integrally formed as a component by so-called two-color molding. The transparent acrylic resin may be replaced by any two-color-moldable resin with transparency of not less than about 70%, such as transparent ABS or transparent PC.

As shown in FIG. 7, a boss 6, 7 is provided on the lower surface of an outer edge of each button 2, 3 in the display cover 1, and when the button 2, 3 is pressed down, the button 2, 3 rocks in the direction of arrow b, c as shown in FIG. 4, whereby the boss 6, 7 pushes the tact switch 35b, 35c provided below it to make an input of switch. Namely, a pushbutton switch is constructed of the button 2, 3, the boss 6, 7, and the tact switch 35b, 35c. An input on either one of the two switches changes over the functions of the composite facsimile device into the printer function or into the automatic answering telephone function. Bosses 9a, 9b, 9c, 9d are provided on the bottom surface of the button 2, 3, as shown in FIG. 7, in order to prevent over stroke upon pressing the button 2, 3 down.

Also, a rib 8 of a rectangular frame is formed on the bottom surface of the main body 1a of the display cover 1, and, as shown in FIG. 4, the rib 8 is in contact with the LCD substrate 37a surrounding the LCD 37, whereby dust can be prevented from intruding onto the display surface of LCD 37 from the outside, thereby preventing the dust from interrupting the display.

As shown in FIG. 5, arms 1d are formed along the both, that and this, sides of the button 2, 3 on each of the both, left and right, ends of the main body 1a of the display cover 1, and ribs 10a, 10b are formed on the bottom surface thereof. The ribs 10a, 10b are in contact with the top surface of the electric circuit board 34, as shown in FIG. 4, whereby the height of the display cover 1 above the board 34 is determined to be constant.

A hole 1e is formed in a distal end of each arm 1d, and the display cover 1 is fixed to the panel cover 33 by pressing bosses, not shown, formed on the bottom surface of panel cover 33 into the associated holes 1e. The fixing method of the display cover 1 may be bonding etc.

Figure 9:
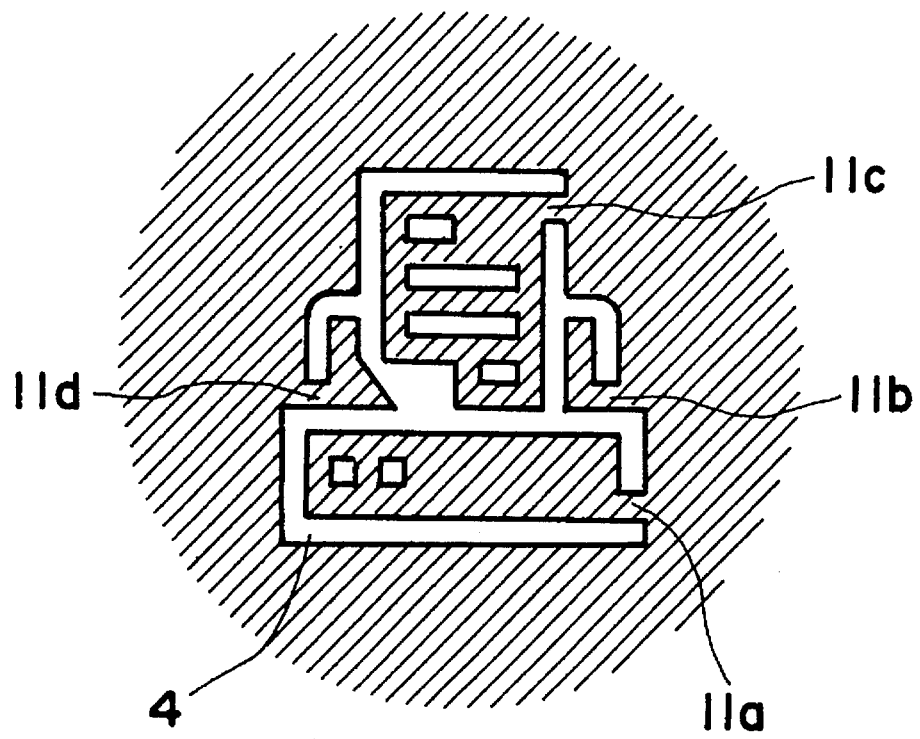
FIG. 9 is an explanatory drawing of one control button shown in FIG. 5.
Figure 10:
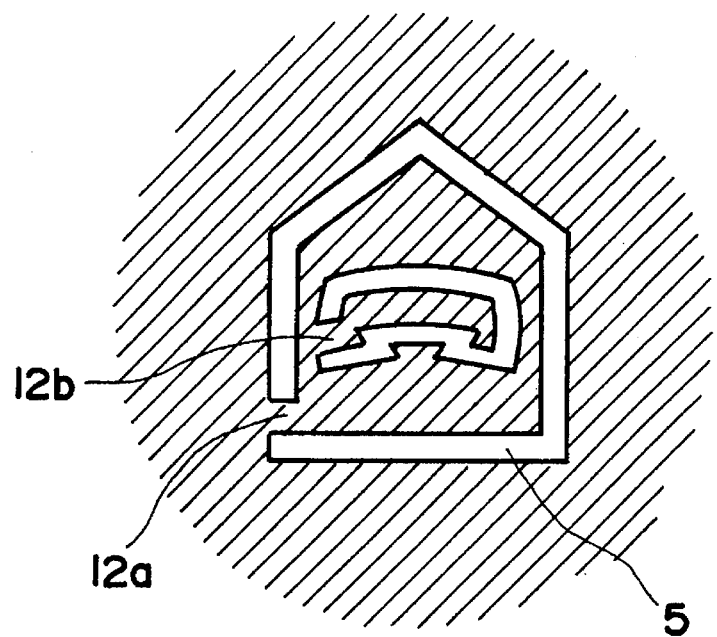
FIG. 10 is an explanatory drawing of the other control button shown in FIG. 5.

Next described referring to FIG. 9 to FIG. 11 is how to form the icons 4, 5 on the buttons 2, 3.

The icon 4 shown in FIG. 9 indicates a printer, which is formed on the printer button 2. Also, the icon 5 shown in FIG. 10 indicates an answering telephone, which is formed on the answering button 3. The hatched portions in FIG. 9 or FIG. 10 represent the opaque resin as described previously, for example of the black base color, and the top surface thereof is covered with the colorless, transparent resin.

Then, as shown in FIG. 11, the pattern of each icon 4, 5 is formed by forming grooves 14 in the bottom side resin portion of the black base color. Slits 11a–11d, 12a, 12b are formed in the pattern of icon 4, 5, as shown in FIG. 9 or FIG. 10, in order to connect the black base resin between inside portions and outside portions of icon 4, 5.

When the LED 36b, 36c placed below the button 2, 3 as shown in FIG. 4 emits light, the icon 4, 5 looks shining. Here, surfaces of the transparent resin as being ceiling surfaces of grooves 14 are roughened, so that the light from LED 36b, 36c is diffused, whereby the icon 4, 5 looks shining beautifully and uniformly.

According to the present embodiment as described above, the buttons 2, 3 are integrally formed with the display cover 1, whereby the number of components can be decreased as to the pushbutton switches in the control panel apparatus including it and whereby the number of assembling manhours can also be decreased so as to lower the costs.

The display cover 1 is formed by the two-color molding from the colorless, transparent resin and the opaque resin having the predetermined color, whereby the icons 4, 5 indicating the functions of pushbutton switches of the buttons 2, 3 can be formed at the same time with the molding of cover 1, without being printed, which decreases the number of production steps so as to lower the costs.

The grooves 13, 15 are formed in the border portions between the main body 1a of the display cover 1 and the buttons 2, 3 so as to make the wall thickness there thinner, so that the buttons 2, 3 are connected through the thin wall portions 1b to the main body 1a so as to be elastically rockable, whereby the buttons 2, 3 can be constructed as movable in the structure which can be realized in a very easy manner and at low cost.

Using the control panel apparatus of the present invention having such a display cover 1 and also having the pushbutton switches with the buttons 2, 3 of the cover as control members, the costs can be lowered by decreasing the number of components and the number of assembling manhours.

Since the printer control keys 30 and answering control keys 31, which are dependent on the buttons 2, 3 and the input functions of which become active through control of the button 2, 3, are located near the pushbutton switches of the buttons 2, 3, respectively, the operability by user is excellent.

Since the openable/closable key cover 27 covering the printer control keys 30 and answering control keys 31 is provided, upon selection of the facsimile function, i.e., upon not using these keys 30, 31, the cover 27 is closed to decrease the number of keys as seen on the control panel, whereby errors in key operation can be decreased.

The switches of the buttons 2, 3 integral with the display cover 1 are switches for changing over the functions of the composite facsimile device in which the control panel is incorporated, and the important switches are provided on either side of the display portion, thereby further enhancing the operability.

Incidentally, the colorless, transparent resin forming the display cover 1 does not have to be perfectly colorless, but may have a very light color; the opaque resin does not have to be perfectly opaque, but may be substantially opaque.

Although the above-described embodiments employed the structure of pushbutton switch or key switch using the tact switch as the switch main body, another type of switch may be employed, for example a switch provided with a movable contact as a key top.

Further, the above-described embodiments employed LCD 37 as a display means in the display portion, but another display means, for example LED or fluorescent tubes, may be, of course, employed.

It is also a matter of course that the structure according to the present invention, of the display cover 1 as described above and the control panel apparatus including it can be applied not only to the composite facsimile device but also the display cover and the control panel for other electronic devices.

As apparent from the above description, because the display cover covering the display portion of electronic device is constructed in the structure in which the pushbuttons of the pushbutton switches are integrally formed therein according to the present invention, the number of components and the number of assembling manhours can be decreased as to the pushbutton switches in the electronic device employing it, thereby lowering the costs.

Since the display cover is formed by the two-color molding with the substantially colorless, transparent resin and the substantially opaque resin having the predetermined color, for example the icons indicating the functions of pushbutton switches, on the pushbuttons integrally formed in the display cover do not have to be formed by printing, but can be formed at the same time with the molding of the display cover, whereby the number of production steps can be deceased so as to lower the costs.

Further, the grooves are formed in the border portions between the main body of display cover and the pushbuttons so as to make the wall thickness there thin, and the pushbuttons are thus connected through the border portions to the main body of display cover so as to be elastically rockable, whereby the pushbuttons can be constructed as movable in the structure which can be realized in a very easy manner and at low cost.

Also, employing the structure of the control panel apparatus having the display portion, provided with the display cover according to the present invention as a display cover covering the display portion, and having the pushbutton switches with the pushbuttons in the display cover as control members, the number of components and the number of assembling manhours can be decreased as to the pushbutton switches of the control panel apparatus, whereby the costs can be lowered.

Further, employing the structure in which the dependent control input switches the input functions of which become active through control of the pushbutton switches are located near the pushbutton switches with the pushbuttons in the display cover as control members in the control panel apparatus, the user can readily identify the layout of related switches and the operability becomes enhanced.

Further, employing the structure in which the openable/closable cover member is provided to cover the dependent control input switches in the control panel apparatus, the cover member can be closed when the dependent control input switches are not used, whereby the number of switches as seen on the control panel can be decreased, thereby decreasing errors in switch operation.

Further, the control panel apparatus is so arranged that the pushbutton switches with the pushbuttons in the display cover as control members are switches for changing over the functions of an electronic device in which the control panel is incorporated, whereby the important switches are provided near the display portion, thus achieving an excellent effect of a further improvement in operability of control panel apparatus.

What is claimed is:

1. A control panel apparatus for electronic devices, comprising:

a panel cover for covering said control panel;

an electric circuit board disposed in said panel cover;

a control switch mounted on said electric circuit board for operating functions of an electronic device;

a display portion mounted adjacent to said control switch on said electric circuit board, for displaying the functions of the electronic device; and a display cover fixed on said panel cover, said display cover integrally including a main portion for covering said display portion and a control portion for controlling said control switch, said display cover having a groove at a border portion between said main portion and said control portion so that said control portion is rockably supported relative to said main portion so as to permit control of said control switch.

2. A control panel apparatus for electronic devices according to claim 1, wherein said display cover is formed by two-color molding of a substantially colorless, transparent resin and a substantially opaque resin having a predetermined color.

3. A control panel apparatus for electronic devices according to claim 2, wherein said display cover is so constructed that an upper portion thereof is of the substantially colorless, transparent resin, a lower portion is of the substantially opaque resin having the predetermined color, and a window portion is provided in a portion corresponding to said display portion of the opaque resin.

4. A control panel apparatus for electronic devices according to claim 3, wherein an icon is formed by a slit in the opaque resin in said control portion and the slit for forming the icon is transparent.

5. A control panel apparatus for electronic devices according to claim 1, wherein the groove formed in the border portion between the main portion of said display cover, and the control portion comprises one groove on a top surface side and another on a lower surface side as opposed to each other.

6. A control panel apparatus for electronic devices according to claim 1, wherein a member for activating said control switch is provided on a lower surface side of the control portion in said display cover.

7. A control panel apparatus for electronic devices according to claim 1, wherein a member for preventing over stroke upon actuation of said control portion is provided on a lower surface side of the control portion in said display cover.

8. A control panel apparatus for electronic devices, comprising:

a panel cover for covering said control panel;

an electric circuit board disposed in said panel cover;

at least one control switch mounted on said electric circuit board for operating functions an electronic device;

a display portion mounted adjacent to said control switch on said electric circuit board, for displaying the functions of the electronic device;

a display cover fixed on said panel cover, said display cover integrally including a main portion for covering said display portion and a control portion for controlling said control switch, an icon being formed on said control portion, said display cover having a groove at a border portion between said main portion and said control portion so that said control portion is rockably supported relative to said main portion so as to permit control of said control switch; and light emitting means for illuminating the icon formed on said control portion, said light emitting means mounted on said electric circuit board so as to illuminate the icon.

9. A control panel apparatus for electronic devices according to claim 8, wherein a pattern of the icon is formed of an opaque resin in the control portion in said display cover and a slit is formed in the pattern of the icon in order to connect the resin inside the icon to the resin outside the icon.

10. A control panel apparatus for facsimile devices, comprising:

a panel cover for covering said control panel;

an electric circuit board disposed in said panel cover;

a first control switch mounted on said electric circuit board for operating a first function of a facsimile device;

a second control switch mounted on said electric circuit board for operating a second function of the facsimile device;

a display portion for displaying the first and second functions of the facsimile device, said display portion being mounted adjacently to said first and second control switches on said electric circuit board; and a display cover fixed on said panel cover, said display cover integrally including a main portion for covering said display portion and first and second control portions for controlling respectively said first and second control switches, said display cover having a groove at a border portion between said main portion and each of said first and second control portions so that said first and second control portions are rockably supported relative to said main portion so as to permit control of said first and second control switches.

* * * * *

UNITED STATES PATENT AND TRADEMARK OFFICE
CERTIFICATE OF CORRECTION

PATENT NO. : 5,610,797

DATED : March 11, 1997

INVENTOR : FUMIHIKO NAKAMURA

It is certified that error appears in the above-identified patent and that said Letters Patent is hereby corrected as shown below:

COLUMN 4

Line 31, Delete "the" (first and second occurrences).
   Line 36, Delete "the" (second occurrence).

COLUMN 5

Line 17, Delete ", that and this,".
   Line 28, "bonding" should read --bonding,--.

COLUMN 6

Line 51, "of" should read --of the--.
   Line 67, "deceased" should read --decreased--.

COLUMN 7

Line 20, "Delete "of".

UNITED STATES PATENT AND TRADEMARK OFFICE
CERTIFICATE OF CORRECTION

PATENT NO. : 5,610,797

DATED : March 11, 1997

INVENTOR : FUMIHIKO NAKAMURA

It is certified that error appears in the above-identified patent and that said Letters Patent is hereby corrected as shown below:

COLUMN 8

Line 34, "functions" should read --functions of--.

Signed and Sealed this

Thirtieth Day of September, 1997

Attest:

BRUCE LEHMAN

Attesting Officer

Commissioner of Patents and Trademarks